(12) United States Patent
Hallit

(10) Patent No.: US 6,551,098 B2
(45) Date of Patent: Apr. 22, 2003

(54) VARIABLE FIRING RATE FUEL BURNER

(75) Inventor: Raymond I. Hallit, Newbury Park, CA (US)

(73) Assignee: Rheem Manufacturing Company, New York, NY (US)

( * ) Notice: Subject to any disclaimer, the term of this patent is extended or adjusted under 35 U.S.C. 154(b) by 0 days.

(21) Appl. No.: 09/791,113

(22) Filed: Feb. 22, 2001

(65) Prior Publication Data

US 2002/0115033 A1 Aug. 22, 2002

(51) Int. Cl.[7] .............................. F23M 9/00; F23Q 9/00; F23D 14/46
(52) U.S. Cl. .................. 431/284; 431/183; 431/350
(58) Field of Search ............................ 431/183, 8, 346, 431/187, 353, 350, 284, 181, 182, 217, 188, 184, 9, 185, 159, 278, 285, 348; 60/29.8; 239/397.5, 419, 424.5, 425, 398, 400, 424, 405, 590

(56) References Cited

U.S. PATENT DOCUMENTS

| | | | | |
|---|---|---|---|---|
| 686,625 A | * | 11/1901 | Machlet, Jr. ................. | 239/552 |
| 1,835,215 A | * | 12/1931 | Hammon ..................... | 431/349 |
| 3,302,596 A | * | 2/1967 | Zinn .......................... | 431/284 |
| 4,412,808 A | | 11/1983 | Sheppard et al. .............. | 431/8 |
| 4,475,885 A | | 10/1984 | Finke ......................... | 431/182 |
| 4,597,342 A | * | 7/1986 | Green et al. .................. | 110/234 |
| 4,701,124 A | * | 10/1987 | Maghon et al. .............. | 431/183 |
| 4,732,093 A | | 3/1988 | Hansen et al. ............... | 110/347 |
| 4,846,666 A | | 7/1989 | Bilawa et al. ................. | 431/8 |
| 4,856,981 A | | 8/1989 | Flanagan ..................... | 431/1 |
| 4,878,829 A | | 11/1989 | Anderson ....................... | 431/8 |
| 4,930,430 A | * | 6/1990 | Allen et al. .................. | 110/263 |
| 4,960,059 A | | 10/1990 | Berkau et al. ............... | 110/347 |
| 5,069,029 A | * | 12/1991 | Kuroda et al. ................. | 60/733 |
| 5,178,533 A | * | 1/1993 | Collenbusch ............... | 239/424 |
| 5,192,204 A | * | 3/1993 | Musil ........................ | 239/404 |
| 5,236,327 A | | 8/1993 | Flanagan et al. ............. | 431/12 |
| 5,308,239 A | * | 5/1994 | Bazarian et al. .............. | 431/10 |
| 5,323,614 A | * | 6/1994 | Tsukahara et al. ............. | 60/737 |
| 5,411,394 A | * | 5/1995 | Beer et al. .................. | 110/262 |
| 5,415,539 A | * | 5/1995 | Musil ........................ | 239/404 |
| 5,449,286 A | | 9/1995 | Snyder et al. ................. | 431/9 |
| 5,451,160 A | * | 9/1995 | Becker ........................ | 431/183 |
| 5,460,513 A | | 10/1995 | Flanagan et al. ............. | 431/9 |
| 5,529,000 A | * | 6/1996 | Hartel et al. ................ | 110/104 B |
| 5,658,139 A | | 8/1997 | Flanagan et al. ............. | 431/7 |
| 5,680,823 A | * | 10/1997 | LaRose ................. | 110/104 B |

(List continued on next page.)

FOREIGN PATENT DOCUMENTS

JP          55049609 A    *  4/1980     ........... F23D/13/00

* cited by examiner

*Primary Examiner*—Henry Bennett
*Assistant Examiner*—Kathryn Ferko
(74) *Attorney, Agent, or Firm*—Konneker & Smith, P.C.

(57) ABSTRACT

A variable firing rate fuel burner has a tubular body configuration defined by a central pilot tube coaxially circumscribed by intermediate and outer firing tubes. A pilot fuel-air mixture is flowed through the pilot tube and ignited to maintain a pilot flame at the open outlet end of the burner body. During firing of the burner, separate fuel-air mixtures are flowed through an intermediate annulus between the intermediate firing tube and the pilot tube, and an outer annulus between the intermediate firing tube and the outer firing tube. As these fuel-air mixtures exit the burner body they are ignited by the pilot flame, with the fuel-air mixture exiting the outer annulus serving as a flame shaping mechanism to provide the overall burner flame with a controlled, elongated shape. By using two separate fuel-air mixture flows surrounding the pilot fuel-air mixture flow, the firing rate of the burner may be easily modulated, and the burner may be simultaneously operated with two different types of fuel.

18 Claims, 2 Drawing Sheets

U.S. PATENT DOCUMENTS

| | | | | |
|---|---|---|---|---|
| 5,743,723 A | | 4/1998 | Iatrides et al. | 431/8 |
| 5,857,846 A | * | 1/1999 | Sattelmayer et al. | 431/183 |
| 5,899,074 A | * | 5/1999 | Komatsu et al. | 60/39.21 |
| 5,993,199 A | * | 11/1999 | Safarik | 239/418 |
| 6,019,595 A | * | 2/2000 | Wulfert et al. | 431/181 |
| 6,027,330 A | | 2/2000 | Lifshits | 431/8 |
| 6,038,864 A | * | 3/2000 | Prade et al. | 431/183 |
| 6,116,171 A | * | 9/2000 | Oota et al. | 110/263 |
| 6,161,387 A | * | 12/2000 | Green | 60/742 |
| 6,189,464 B1 | * | 2/2001 | Okazaki et al. | 110/263 |
| 6,315,551 B1 | * | 11/2001 | Salzsieder et al. | 239/400 |
| 6,379,146 B1 | * | 4/2002 | Zink et al. | 110/262 |

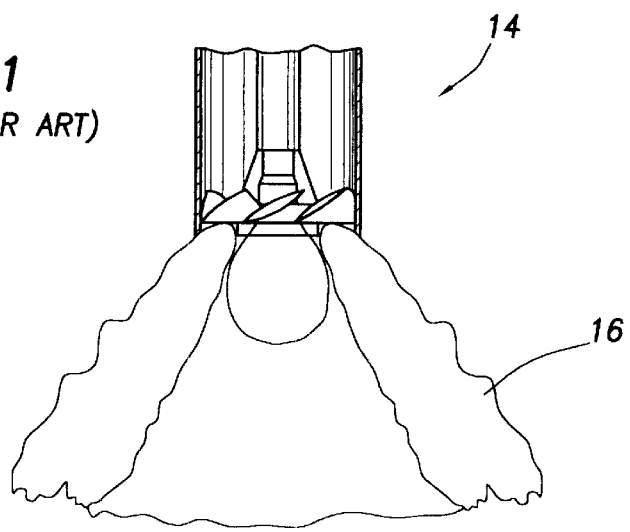
FIG. 1 (PRIOR ART)
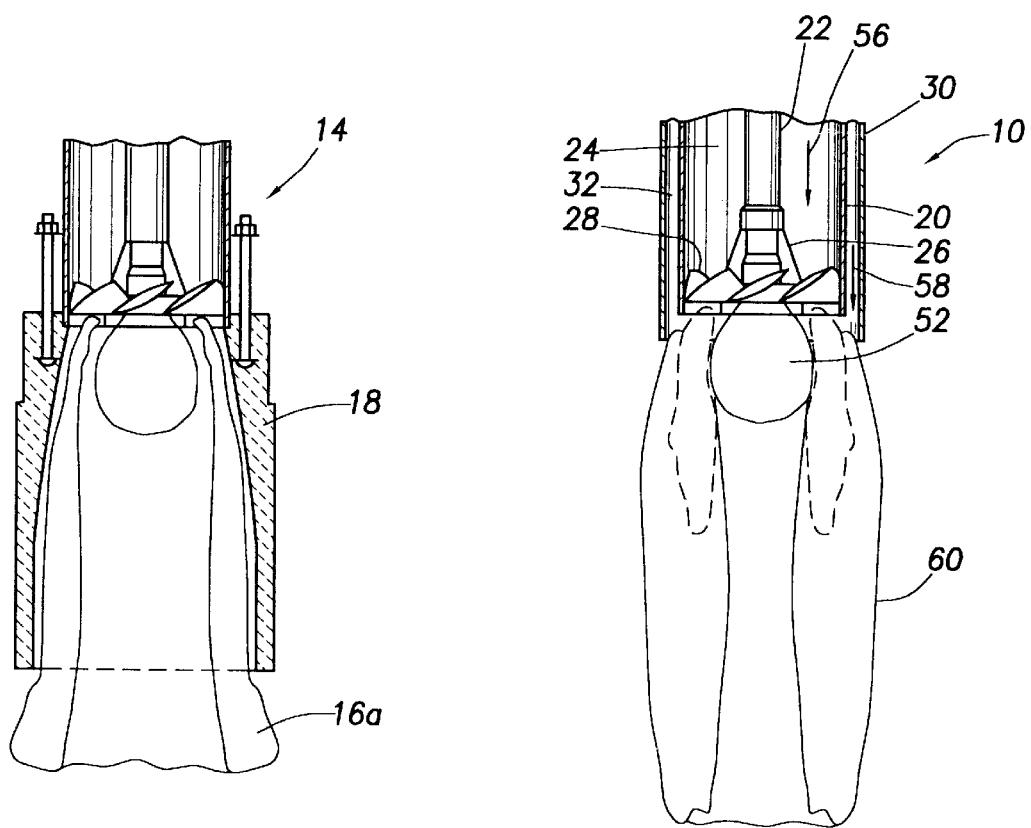
FIG. 2 (PRIOR ART)
FIG. 3

VARIABLE FIRING RATE FUEL BURNER

BACKGROUND OF THE INVENTION

The present invention generally relates to combustion apparatus and, in a preferred embodiment thereof, more particularly relates to a specially designed variable firing rate fuel burner.

Fuel burners are utilized in a variety of heating applications in which the burner operates to transfer combustion heat to a heat exchanger to thereby heat a fluid being flowed through the heat exchanger during firing of the burner. In some of these heating applications it is desirable that the pattern of the flame emanating from the outlet of the burner be considerably elongated parallel to the axis of the burner to suit the interior geometry of the heat exchanger and/or to satisfy certain heat transfer efficiency design parameters.

One previously proposed technique used to provide the burner flame with the requisite elongated shape was to coaxially attach to the outlet end of the burner a tubular ceramic flame shaper that axially projected a considerable distance beyond the outlet end of the burner body. While this technique provided the burner flame with the desired elongated shape, it had certain problems, limitations and disadvantages such as being fragile, relatively expensive, and undesirably increasing the overall length of the burner body.

In burner-fired heat exchanger applications of this general type it is often desirable to vary the firing rate of the burner. However, in conventional fuel burner design it is often difficult to substantially reduce the firing rate of the burner without potentially creating undesirable flame "flashback".

In view of the foregoing it can be seen that a need exists for an improved fuel burner which eliminates or at least substantially reduces the above-mentioned problems, limitations and disadvantages commonly associated with fuel burners of conventional constructions. It is to this need that the present invention is directed.

SUMMARY OF THE INVENTION

In carrying out principles of the present invention, in accordance with a preferred embodiment thereof, an improved fuel burner apparatus is provided which comprises a body having an outlet end and including a pilot conduit extending along an axis and through which a pilot fuel/air mixture may be flowed, discharged through the outlet end, and ignited to create a pilot flame. An inner firing conduit circumscribes the pilot conduit and laterally defines therebetween a first flow space communicating with the body outlet end. An outer firing conduit circumscribes the inner firing conduit and laterally defines therebetween a second flow space communicating with the body outlet end.

The fuel burner apparatus also includes a fuel/air delivery system operative to force fuel and air through each of the first and second body flow spaces, for discharge through the body outlet end and ignition by the pilot flame, to responsively create a main burner flame. According to a key aspect of the present invention, the burner body is configured in a manner such that the flow of fuel and air discharged from the second body flow space functions to laterally constrain the main burner flame, representatively providing the main burner flame with a relatively thin, axially elongated configuration. The inner and outer firing conduits have downstream ends, and the downstream end of the outer firing conduit is preferably axially offset from the downstream end of the inner firing conduit in a downstream direction to aid in the shaping of the main burner flame.

According to other aspects of the present invention, the fuel/air delivery system is operative to force separate first and second fuel/air mixtures respectively through the first and second burner body flow spaces, and the fuel/air delivery system is operative to utilize different fuels in the separate first and second fuel/air mixtures.

In an illustrated preferred embodiment of the fuel burner, the fuel/air delivery system includes first and second fuel injectors respectively communicated with the first and second flow spaces and operative to receive fuel from at least one source thereof. An air inlet plenum structure is carried by the burner body, and first and second mixing plenum structures extend through the air inlet plenum structure, the first and second mixing plenum structures being respectively coupled to the first and second fuel injectors, having air inlet openings therein, and respectively communicating with the first and second burner body flow spaces. The fuel burner further includes an air delivery structure operatively coupled to the first and second flow spaces, the air delivery structure representatively including an air supply fan having an outlet communicated with the interior of the air inlet plenum structure.

According to another aspect of the present invention, the outlet end of the burner body is operatively coupled to a heat exchanger through which a fluid to be heated may be flowed, the heat exchanger having an interior space for receiving the main burner flame from which combustion heat may be transferred to the fluid being flowed through the heat exchanger. Representatively, the heat exchanger has a series of interior heating tubes through which the fluid to be heated may be flowed, the series of interior heating tubes circumscribing the burner flame-receiving interior space of the heat exchanger and longitudinally extending parallel to the axis of the burner body. The axial elongation of the main burner flame injected into the interior of the heat exchanger parallel to the heat exchanger tubes substantially enhances the overall heat transfer efficiency of the overall fuel-fired heat exchange apparatus.

BRIEF DESCRIPTION OF THE DRAWINGS

FIG. 1 (Prior Art) is a simplified cross-sectional view of an outlet end portion of a conventional fuel burner;

FIG. 2 (Prior Art) is a view similar to that in FIG. 1, but with a tubular ceramic flame shaper operatively connected to the outlet end of the conventional fuel burner;

FIG. 3 is a simplified cross-sectional view of an outlet end portion of a specially designed variable firing rate fuel burner embodying principles of the present invention.

DETAILED DESCRIPTION

Figure 4:
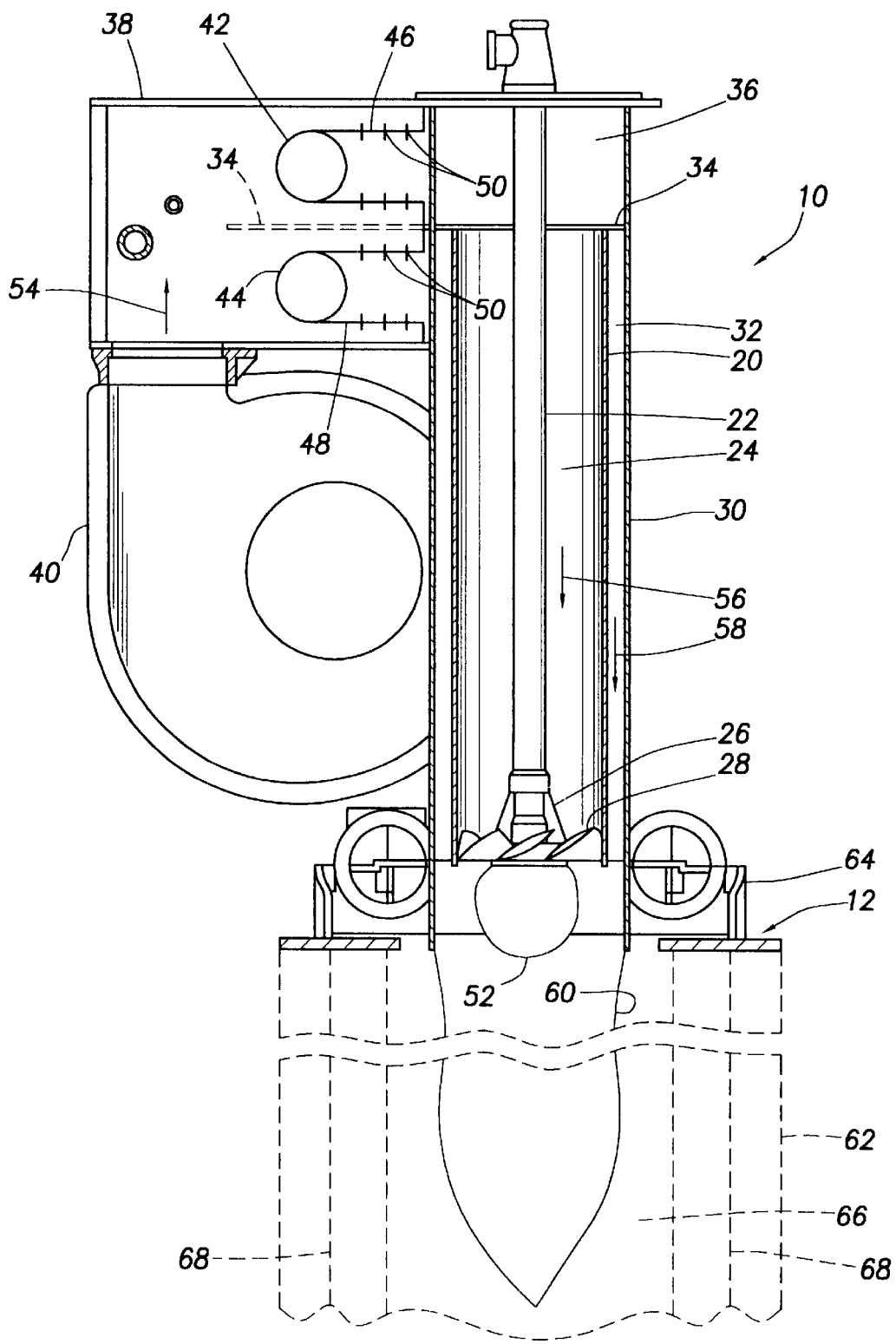
FIG. 4 is a simplified, somewhat schematic full cross-sectional view through the variable firing rate fuel burner of the present invention operatively connected to a representative heat exchanger, only a portion of which is illustrated.

As illustrated in FIGS. 3 and 4, this invention provides a specially designed variable firing rate fuel burner 10. Burner 10 is illustratively depicted in a downfire orientation and is representatively connected at its outlet to the upper end of a schematically depicted, vertically elongated heat exchanger structure 12 (see FIG. 4), only a vertical portion of which is illustrated. Burner 10 constitutes a substantial improvement of the prior art fuel burner 14 shown in FIG. 1, burner 14 being similar in some regards to the burner shown in FIG. 12 of U.S. Pat. No. 5,658,139 which is hereby incorporated herein by reference. The prior art burner 14 had several problems such as (1) its main outlet flame 16 being too laterally divergent (i.e., wide) for use in, for example, the vertically elongated heat exchanger structure 12 (see FIG. 4), and (2) its firing rate being difficult to modulate.

To a certain extent the desirable narrowing of the burner outlet flame 16 was solved, as illustrated in FIG. 2 (Prior Art), by attaching to the outlet of the prior art burner 14 a tubular ceramic flame shaper 18 which "shapes" the outlet flame 16 to the indicated narrower configuration 1 However, the ceramic flame shaper 18 was expensive, fragile, and undesirably increased the overall burner length. Additionally, the flame shaper did nothing to add firing rate modulation capabilities to the burner 14.

Turning now to FIGS. 3 and 4, the improved, variable firing rate fuel burner 10 of the present invention incorporates the general structure of the FIG. 1 burner 14 as a tubular inner body portion of the improved burner 10 which comprises an inner firing tube or conduit 20, a pilot tube or conduit 22 outwardly circumscribed by the firing tube 20 and creating an annular flow space 24 therewith, a bluff body 26 carried on the lower end of the pilot tube 22, and an annular array of circumferentially spaced flame-holding swirl vanes 28 disposed at the lower end of the annular flow space 24.

Burner 10 also includes an outer firing tube or conduit 30 that outwardly circumscribes the inner firing tube 20 and creates an annular flow space 32 therewith. As illustrated, the open lower end of the outer firing tube 30 is preferably downwardly offset from the open lower end of the inner firing tube 20.

A blank-off plate 34 (see FIG. 4) internally located at an upper end portion of the burner 10 blocks the upper end of the outer annular flow space 32 and separates the flow space 32 from an upper end chamber 36 in the burner body which is communicated at its lower side with the inner annular flow space 24. Upper end chamber 36 and an upper end portion of the outer annular flow space 32 communicate with the interior of an air inlet plenum structure 38 disposed at the upper end of the burner 10 and coupled to the outlet of an air supply fan 40.

Fuel injectors 42, 44 are operatively connected to mixing plenum structures 46, 48 disposed in the air inlet plenum structure 38 and respectively communicated with the upper end chamber 36 and an upper end portion of the outer annular flow space 32. Each of the mixing plenum structures 46, 48 has a series of air inlet openings 50 formed therein.

During operation of the burner 10, a fuel-air mixture is flowed downwardly through the pilot tube 22 to maintain a pilot flame 52 adjacent the lower end of the burner 10. Pilot flame 52 is initiated by a suitable igniter structure (not shown). Fuel from a source thereof is forced into the fuel injectors 42 and 44, and combustion air 54 is forced into the inlet plenum structure 38 by the fan 40. The air 54 entering the plenum 38 is forced into the mixing plenum structures 46,48 through their air inlet openings 50 and mixed with fuel discharged from the injectors 42,44 to form (1) a first or inner premixed fuel-air flow 56 that is forced downwardly through the inner annular flow space 24 for downward discharge therefrom and ignition by the pilot flame 52, and (2) a second or outer premixed fuel-air flow 58 that is forced downwardly through the outer annular flow space 32 for discharge therefrom and ignition at the lower end of the burner 10.

This forcible discharge of the annular outer premixed fuel-air flow 58 outwardly around the discharged inner premixed fuel-air flow 56 causes the outer premixed fuel-air flow 58 to function as a flame shaping structure that takes the place of the previously described ceramic flame shaper 18 (see FIG. 2) and operates to cause the resulting main burner flame 60 to assume the desired long, narrow shape without the use of the ceramic flame shaper 18.

Additionally, the use of the two premixed fuel-air mixture flows 56,58 provides the burner 10 with substantially enhanced firing rate adjustment capabilities by simply reducing or increasing the amount of fuel supplied to the injectors 42,44 and/or reducing the air supply to the burner. Further, the dual premixed fuel-air flow capability permits the burner 10 to be simultaneously operated with two different types of fuel simply by supplying each injector 42,44 with a different type of fuel.

In addition to its enhanced firing rate adjustment capability and dual-fuel operational capability, the unique structure of the burner 10 just described provides it with a variety of other advantages compared to conventionally configured fuel burners. These other advantages include lowered NOx emission rates, enhanced stability, better fuel/air mixing characteristics and a lowered burner pressure drop.

The unique configuration and operation of the burner 10 also enhances the performance of the elongated heat exchanger 12 (see FIG. 4) due to the correspondingly elongated burner flame 60. Representatively, the heat exchanger 12 has a vertically elongated cylindrical body 62 with a header section 64 at its upper end, the outlet end of the burner 10 being operatively connected to the header section 64. The elongated burner flame 60 is forced downwardly into a vertically elongated firing space 66 disposed in the interior of the heat exchanger body 62 and surrounded by a circumferentially spaced array of vertically oriented heat exchanger tubes 68 disposed in the interior of the heat exchanger 12 (only two of the tubes 68 being shown). During operation of the heat exchanger 12, a fluid (for example, water) to be heated is flowed through the tubes 68 and receives combustion heat from the burner outlet flame 60. Due to the unique flame shaping capability of the burner 10 described above, the elongated flame 60 is generally parallel to the lengths of the tubes 68, thereby desirably enhancing the heat transfer efficiency of the heat exchanger 12.

The foregoing detailed description is to be clearly understood as being given by way of illustration and example, the spirit and scope of the present invention being limited solely by the appended claims.

What is claimed is:

1. Fuel burner apparatus comprising:

a body having an outlet end and including:

a pilot conduct extending along an axis and through which, during operation of said fuel burner apparatus, a pilot fuel/air mixture is flowed, discharged and invited to create a central pilot flame extending laterally outwardly from said axis, an inner firing conduit circumscribing said pilot conduit and laterally defining therebetween a first flow space communicating with said outlet end and laterally extending from said inner firing conduit to said pilot conduit, and an outer firm conduit circumscribing said inner firing conduit and laterally defining therebetween a second flow space communicating with said outlet end, said inner and outer firing conduits having downstream ends; and a fuel/air delivery system configured to operatively force pre-mixed flows of fuel and air, formed externally of said inner and outer firing conduits, through each of said first and second flow spaces, for ignition by the central pilot flame and discharge through said outlet end which is configured to responsively create a main burner flame surrounding and extending axially past the central pilot flame, the downstream end of said outer firing conduit being axially offset from the downstream end of said inner firing conduit in a downstream direction, said fuel/air delivery system including:
first and second fuel injectors respectively communicated with said first and second flow spaces and operative to receive fuel from at least one source thereof, and
an air delivery structure operatively coupled to said first and first and second flow spaces,
said body being configured in a manner such that the pre-mixed flow of fuel and air discharged from said second flow space functions to laterally constrain the main burner flame.

2. The fuel burner apparatus of claim 1, wherein:
said fuel/air delivery system is operative to force separate first and second fuel/air mixtures respectively through said first and second flow spaces.

3. The fuel burner apparatus of claim 2 wherein:
said fuel/air delivery system is operative to utilize different fuels in said separate first and second fuel/air mixtures.

4. The fuel burner apparatus of claim 1 wherein:
said fuel/air delivery system includes:
an air inlet plenum structure carried by said body externally of
said inner and outer firing conduits,
separate first and second perforated mixing plenum structures enclosed within said air inlet plenum structure, said separate first and second mixing plenum structures being respectively coupled to said first and second fuel injectors and respectively communicating with said first and second flow spaces, and
said air delivery structure includes an air supply fan having an outlet communicated with the interior of said air inlet plenum structure.

5. The fuel burner apparatus of claim 1 wherein:
the flow of fuel and air traversing said second flow space is discharged therefrom in a substantially non-swirling pattern.

6. A variable firing rate fuel burner comprising:
a body having an outlet end and including:
a pilot tube extending along an axis and through which, during operation Of said burner, a pilot fuel/air mixture is flowed, discharged and ignited to create a central pilot flame extending laterally outwardly from said axis,
an inner firing tube coaxially circumscribing said pilot tube and laterally defining therebetween a first annular flow space communicating with said outlet end,
an outer firing tube coaxially circumscribing said inner firing tube and laterally defining therebetween a second annular flow space communicating with said outer end, and
a fuel/air mixture inlet plenum portion having an interior and being operative to receive a fuel/air mixture during operation of said burner and discharge the received fuel/air mixture only into said first annular flow space, and
a fuel/air delivery system operative to force separate pre-mixed first and second flows of fuel and air, formed externally of said inner and outer firing tubes, respectively through said first and second annular flow spaces, for ignition by the central pilot flame and discharge through said outlet end, to responsively create a main burner flame surrounding and extending axially past the central pilot flame, said fuel/air delivery system including:
an air inlet plenum structure having an interior and being externally carried by said body,
a supply air fan having an outlet communicated with the interior of said air inlet plenum structure,
separate first and second perforated mixing plenum structures disposed within said air inlet plenum structure for receiving air forced into said air inlet plenum structure by said supply air fan, said separate first and second perforated mixing plenum structures having interiors respectively communicated with the interior of said fuel/air mixture inlet plenum portion of said body and said second annular flow space, and
first and second fuel injectors respectively communicated with the interiors of said separate first and second perforated mixing plenum structures.

7. The variable firing rate fuel burner of claim 6 wherein:
said fuel/air delivery system is operative to utilize different fuels in said separate first and second fuel/air mixtures.

8. The variable firing rate fuel burner of claim 6 wherein:
said inner and outer firing tubes have downstream ends, and
the downstream end of said outer firing tube is axially offset from the downstream end of said inner firing tube in a downstream direction.

9. The variable firing rate fuel burner of claim 6 wherein said body is configured in a manner such that said second fuel/air mixture, when discharged from said second annular flow space, functions to laterally constrain the main burner flame.

10. The variable firing rate fuel burner of claim 9 wherein said second fuel/air mixture, when discharged from said second annular flow space, functions to provide the main burner flame with an axially elongated shape.

11. The variable firing rate fuel burner of claim 6 wherein:
the second fuel/air mixture is discharged from said second annular flow space in a substantially non-swirling pattern.

12. Fuel-fired heat exchange apparatus comprising:
a heat exchanger through which, during operation of said fuel-fired heat exchange apparatus, a fluid to be heated is flowed, said heat exchanger having an interior space for receiving a fuel burner flame from which combustion heat is transferred to the fluid being flowed through said heat exchanger; and
a variable firing rate fuel burner including:
a body having an outlet end and including:
a pilot tube extending along an axis and through which, during operation of said burner, a pilot fuel/air mixture is flowed, discharged and ignited to create a central pilot flame extending laterally outwardly from said axis,
an inner firing tube coaxially circumscribing said pilot tube and laterally defining therebetween a first annular flow space communicating with said outlet end,
an outer firing tube coaxially circumscribing said inner firing tube and laterally defining therebetween a second annular flow space communicating with said outer end, and a fuel/air mixture inlet plenum portion having an interior and being operative to receive a fuel/air mixture during operation Of said burner and discharge the received fuel/air mixture only into said first annular flow space, and a fuel/air delivery system operative to force separate pre-mixed first and second flows of fuel and air, formed externally of said inner and outer firing tubes, respectively through said first and second annular flow spaces, for ignition by the central pilot flame and discharge through said outlet end, to responsively create a main burner flame surrounding and extending axially past the central pilot flame, said fuel/air delivery system including:

an air inlet plenum structure having an interior and being externally carried by said body, a supply air fan having an outlet communicated with the interior of said air inlet plenum structure, separate first and second perforated mixing plenum structures disposed within said air inlet plenum structure for receiving air forced into said air inlet plenum structure by said supply air fan, said separate first and second perforated mixing plenum structures having interiors respectively communicated with the interior of said fuel/air mixture inlet plenum portion of said body and said second annular flow space, and first and second fuel injectors respectively communicated with the interiors of said separate first and second perforated mixing plenum structures.

13. The fuel-fired heat exchange apparatus of claim 12 wherein:

said fuel/air delivery system is operative to utilize different fuels in said separate first and second fuel/air mixtures.

14. The fuel-fired heat exchange apparatus of claim 12 wherein:

said inner and outer firing tubes have downstream ends, and the downstream end of said outer firing tube is axially offset from the downstream end of said inner firing tube in a downstream direction.

15. The fuel-fired heat exchange apparatus of claim 12 wherein said body is configured in a manner such that said second fuel/air mixture, when discharged from said second annular flow space, functions to laterally constrain the main burner flame.

16. The fuel-fired heat exchange apparatus of claim 15 wherein said second fuel/air mixture, when discharged from said second annular flow spaced, functions to provide the main burner flame with an axially elongated shape.

17. The fuel-fired heat exchange apparatus of claim 16 wherein:

said heat exchanger has a series of interior heating tubes through which the fluid to be heated may be flowed, said series of interior heating tubes circumscribing said interior space and longitudinally extending parallel to said axis.

18. The fuel-fired heat exchange apparatus of claim 12 wherein:

the second fuel/air mixture is discharged from said second annular flow space in a substantially non-swirling pattern.

* * * * *

UNITED STATES PATENT AND TRADEMARK OFFICE
CERTIFICATE OF CORRECTION

PATENT NO.   : 6,551,098 B2
DATED        : April 22, 2003
INVENTOR(S)  : Raymond I. Hallit It is certified that error appears in the above-identified patent and that said Letters Patent is hereby corrected as shown below:

Column 4,
Line 51, change "conduct" to conduit --.
Line 54, change "invited" to -- ignited --.
Line 61, change "firm" to -- firing --.

Column 5,
Line 50, change "Of" to -- of --.

Signed and Sealed this

Second Day of September, 2003

JAMES E. ROGAN
*Director of the United States Patent and Trademark Office*